United States Patent [19]
Hata et al.

[11] Patent Number: 6,033,749
[45] Date of Patent: Mar. 7, 2000

[54] FUEL TANK

[75] Inventors: Nobuhiro Hata; Taichi Negi, both of Kurashiki, Japan

[73] Assignee: Kuraray Co., Ltd., Kurashiki, Japan

[21] Appl. No.: 08/896,443

[22] Filed: Jul. 18, 1997

Related U.S. Application Data

[63] Continuation of application No. 08/643,011, May 3, 1996, abandoned.

[30] Foreign Application Priority Data

May 12, 1995 [JP] Japan .................................. 7-114459

[51] Int. Cl.$^7$ ................................... B65D 88/12
[52] U.S. Cl. .................... 428/36.7; 428/36.6; 220/562; 220/415; 220/456; 220/457; 206/524.1; 206/524.2; 206/524.3
[58] Field of Search ................................ 428/36.6, 36.7; 220/562, 415, 456, 457; 206/524.1, 524.2, 524.3, 524.5; 280/830

[56] References Cited

U.S. PATENT DOCUMENTS

| | | |
|---|---|---|
| 5,230,935 | 7/1993 | Delimoy et al. . |
| 5,443,874 | 8/1995 | Tachi ...................................... 428/36.7 |
| 5,547,722 | 8/1996 | Uehara et al. .......................... 428/35.7 |

OTHER PUBLICATIONS

Taichi Negi et al, "Basic Study on Multilayer EVOH Fuel Tank Performance", Maach Business Services (Conference), Recycle '95, Davos Global Forum and Exposition, Davos, Switzerland, May 15, 1995.

*Primary Examiner*—Charles Nold
*Attorney, Agent, or Firm*—Oblon, Spivak, McClelland, Maier & Neustadt, P.C.

[57] ABSTRACT

Disclosed herein is a fuel tank of multi-layer construction having good impact resistance as well as good barrier properties for gasoline, especially one containing methanol and MTBE.

The fuel tank comprises (a) inner and outer layers of high-density polyethylene, (b) intermediate layers of adhesive resin, and (c) a core layer of ethylene-vinylalcohol copolymer, with said core layer (c) being shifted to the inside. For better performance, the layer (c) has a thickness which satisfies the formula below.

$$0.005 \leq A/B \leq 0.13 \qquad (1)$$

where A is the thickness of the layer (c), and
B is the thickness of all the layers.
The fuel tank is suitable especially for oxygen-containing gasoline.

18 Claims, No Drawings

FUEL TANK

This application is a Continuation of application Ser. No. 08/643,011, filed on May 3, 1996, now abandoned.

BACKGROUND OF THE INVENTION

1. Field of the Invention

The present invention relates to an automobile fuel tank which has good impact resistance as well as good impermeability to automobile fuel, especially gasoline blended with methanol or methyl t-butyl ether (MTBE).

2. Description of the Prior Art

Plastics fuel tanks are coming into general use. Most popular among them are those of single-layer type made of polyethylene. Their disadvantage is a comparatively high permeability to gasoline. Conventional measures against this were sulfonation of the polyethylene tank (Japanese Patent Publication No. 23914/1971), fluorination of the polyethylene tank (Japanese Patent Publication Nos. 21877/1972 and 15862/1978), and blending of polyethylene with nylon as a barrier material (Japanese Patent Laid-open No. 296331/1992). There has also been proposed a plastics fuel tank of five-layer construction in which the inner and outer layers are made of high-density polyethylene and the middle layer is made of nylon and they are bonded together with adhesive resin layers.

It has been found that these prior art technologies do not cope with the recent situation arising from the use of the gasoline which contains oxygenated compounds such as methanol, ethanol or MTBE (referred to as oxygen-containing gasoline hereinafter) which started in the U.S. to prevent air pollution, to reduce gasoline consumption, to improve the octane number of gasoline, and to lower the amount of unburnt hydrocarbon in exhaust gas. Unfortunately, the above-mentioned sulfonation or fluorination of the single-layered polyethylene fuel tank does not provide sufficient barrier properties for oxygen-containing gasoline. Likewise, the combination of nylon with polyethylene (in the form of multi-layer or dispersion) does not completely prevent permeation of oxygen-containing gasoline through the fuel tank.

To address this problem, there has been proposed a multi-layer fuel tank composed of polyethylene and ethylene-vinyl alcohol copolymer (EVOH for short hereinafter) which exhibits good gasoline barrier properties. Although it is superior in barrier properties to the conventional fuel tanks, there still is room for improvement to meet the future environmental regulations. Improvement in impact resistance is another subject to be considered.

One way to approach problems involved in the fuel tank having an intermediate layer of EVOH is by blending EVOH with polyolefin or polyamide (as proposed in Japanese Patent Laid-open Nos. 218891/1994 and 52333/1995). However, the problems still remain unsolved because such blending appreciably impairs the gasoline barrier properties and adversely affects the melt stability of the raw material.

SUMMARY OF THE INVENTION

The present invention was completed in view of the foregoing. It is an object of the present invention to provide a multi-layered fuel tank composed of high-density polyethylene and EVOH layers, which is superior in gasoline barrier properties (especially for oxygen-containing gasoline) and impact resistance.

This object could be achieved on the basis of the surprising finding that a fuel tank of multi-layer construction which comprises (a) inner and outer layers of high-density polyethylene, (b) intermediate layers of adhesive resin, and (c) a core layer of ethylene-vinyl alcohol copolymer shows the above-mentioned desired properties if the total thickness of the layers positioned inside the layer (c) is smaller than the total thickness of the layers positioned outside of the layer (c).

According to a preferred embodiment of the present invention, the layer (c) has a thickness which satisfies the formula below.

$$0.005 \leq A/B \leq 0.13 \tag{1}$$

where A is the thickness of the layer (c), and
B is the thickness of all the layers.

The present invention especially produces its noticeable effect when the fuel tank is used for gasoline comprising oxygene-containing compounds.

According to the present invention, the multi-layer construction is characterized in that the total thickness of the layers positioned inside the layer (c) is smaller than the total thickness of the layers positioned outside of the layer (c). This arrangement contributes to the superior barrier properties (especially for oxygen-containing gasoline) and good impact resistance. These characteristics make the fuel tank to meet the environmental and safety regulations. The multi-layer construction provides as good barrier properties and impact resistance as the conventional one even though the EVOH layer is reduced in thickness. This leads to cost reduction and thickness reduction (and hence weight reduction)

These effects are enhanced when the formula (1) above is satisfied.

DESCRIPTION OF THE PREFERRED EMBODIMENTS

The fuel tank of the present invention is constructed of (a) inner and outer layers of high-density polyethylene, (b) intermediate layers of adhesive resin, and (c) a core layer of ethylene-vinyl alcohol copolymer. It is extremely important in the present invention that the ratio (I/O) is smaller than 50/50, where I is the total thickness of the layers positioned inside of the layer (c), and O is the total thickness of the layers positioned outside of the layer (c), in other words that the core layer (c) is shifted to the inside of the fuel tank wall.

(Incidentally, the thickness of each layer is an average measured at the bulge of the fuel tank.)

Shifting the EVOH layer (c) to the inside improves the gasoline barrier properties and impact resistance, as demonstrated in Example 1 and Comparative Examples 3 to 5. It is to be noted that the value of gasoline barrier properties is increased more than four-fold by moving the EVOH layer (c) from the outermost position (as in Comparative Example 5) to the innermost position (as in Comparative Example 3), with the layers (a), (b), and (c) being the same in thickness. It is also noted that the value of gasoline barrier properties is increased about 1.5-fold by moving the EVOH layer (c) from the center (as in Comparative Example 4) to the position where the ratio (I/O) is 20/80 (as in Example 1). It is significant that the performance of the fuel tank of multi-layer construction greatly varies as mentioned above although the materials and their amount are substantially the same.

The reason for the above-mentioned effect of improving gasoline barrier properties is not known. It is believed that the degree of swelling of the high-density polyethylene layer (a) and EVOH layer (c) due to gasoline, methanol, and MTBE varies depending on the position of the EVOH layer (c).

Also, shifting the EVOH layer (c) to the inside improves the impact resistance of the fuel tank, as demonstrated in Example 1 and Comparative Example 4. That is, the height for breakage in drop test is 5.7 m in the case where the EVOH layer (c) is positioned at the center (as in Comparative Example 4), whereas the height for breakage in drop test is increased to 7.6 m in the case where the EVOH layer (c) is shifted to the position where the ratio (I/O) is 20/80 (as in Example 1). Presumably, the improvement in impact resistance is due to the soft, thick HDPE layer placed outside. Incidentally, although shifting the EVOH layer (c) to the inside improves the impact resistance of the fuel tank, there is an optimum position for the most desired effect.

As mentioned above, shifting the EVOH layer (c) to the inside improves the gasoline barrier properties and impact resistance of the fuel tank. The greater the distance of shifting, the better the result. Thus, the position for shifting should be such that the ratio (I/O) is equal to or smaller than 45/55, preferably 40/60, more preferably 35/65, and most desirably 30/70.

According to the present invention, the fuel tank of multi-layer construction comprises (a) inner and outer layers of high-density polyethylene, (b) intermediate layers of adhesive resin, and (c) a core layer of ethylene-vinyl alcohol copolymer. The core layer (c) should be shifted to the inside but should not be at the innermost position. In other words, the innermost layer should be the high-density polyethylene layer (a). The reason for this is that the fuel tank is usually formed by extrusion blow molding which involves the step of pinching-off the parison. So as to form a strong bottom, the parison should be closed with good adhesion.

Thus, the position for shifting should be such that the ratio (I/O) is equal to or greater than 1/99, preferably 2/98, more preferably 5/95, and most desirably 10/90.

Also, the present invention produces its noticeable effect when the EVOH layer (c) has a thickness which satisfies the formula below.

$$0.005 \leq A/B \leq 0.13 \quad (1)$$

where A is the thickness of the layer (c), and
B is the thickness of all the layers.

If the ratio (A/B) is smaller than 0.005, the EVOH layer (c) would be too thin to produce the desired gasoline barrier properties and would be uneven in thickness. The ratio (A/B) should be greater than 0.01, preferably greater than 0.02. If the ratio (A/B) is greater than 0.13, the EVOH layer (c) would be thicker than necessary (which leads to cost increase) and have an adverse effect on impact resistance. Therefore, the ratio (A/B) should be smaller than 0.10, preferably smaller than 0.07.

The EVOH used in the present invention is one which is obtained by saponification of an ethylene-vinyl ester copolymer. It should contain ethylene units in an amount of 20–60 mol %. With an amount less than 20 mol %, it is poor in moldability and gasoline barrier properties under the high-humidity condition. A preferred amount is more than 25 mol % and a more preferred amount is more than 30 mol %. Conversely, with an amount in excess of 60 mol %, it is poor in gasoline barrier properties. A preferred amount is less than 50 mol % and a more preferred amount is less than 40 mol %.

A typical example of the vinyl ester is vinyl acetate. It is possible to use other fatty acid vinyl esters, such as vinyl propionate and vinyl pivalate.

The EVOH may contain additional comonomers in an amount not harmful to the effect of the present invention. For example, the EVOH may be incorporated with 0.0002–0.2 mol % of vinyl silane compound so that the resulting EVOH has the same melt viscosity as the base resin for coextrusion. The consequence is uniform coextrusion for multiple layers and good blending performance. Examples of the vinyl silane compound include vinyltrimethoxysilane, vinyltriethoxysilane, vinyltri(-methoxyethoxy)silane, and 3-(trimethoxysilyl)propyl methacrylate. Of these examples, the first two are desirable. Additional examples of the comonomer include propylene, butylene, unsaturated carboxylic acids and esters thereof (such as (meth)acrylic acid and (meth)acrylate ester), and vinyl pyrrolidone.

The EVOH used in the present invention should have a melt index (MI) in the range of 0.1–50 g/10 min, preferably 0.5–20 g/10 min, at 190° C. under a load of 2160 g. For samples having a melting point in the neighborhood of or in excess of 190° C., measurements are carried out at several points above the melting point under a load of 2160 g, and the melt index is determined by extrapolating the measured values to 190° C. on a semilogarithmic graph, with the reciprocal of the absolute temperature on the abscissa of ordinary scale and the melt index on the ordinate of logarithmic scale.

There may be an instance where a better result is obtained when EVOH is blended with one or more than one kind of other EVOH which differs in the content of ethylene and/or the degree of hydrolysis.

The EVOH layer (c) in the present invention should essentially be made of EVOH alone; however, the present invention does not preclude blending EVOH with any other resin in an amount not harmful to its effect. Examples of such resins include polyolefin resin, polystyrene, polyamide resin, saturated polyester resin (such as polyethylene terephthalate), polycarbonate resin, polyvinyl chloride resin, and polyvinylidene chloride resin. Additional desirable examples include ethylene-acrylate ester-maleic anhydride terpolymer and modified polyolefin having at least one functional group selected from boronic acid group, borinic acid group, and boron-containing group convertible into boronic acid group or borinic acid group in the presence of water. The amount of the blending resin should be limited in consideration of gasoline barrier properties and melt stability.

The high-density polyethylene used for layer (a) in the present invention is one which is obtained by the low-pressure process or medium-pressure process which employs the Ziegler catalyst. It should have a density higher than 0.93 g/cm$^3$, preferably higher than 0.94 g/cm$^3$. With a density lower than 0.93 g/cm$^3$, the high-density polyethylene is so poor in gasoline barrier properties and stiffness that it cannot be used for the fuel tank. The high-density polyethylene should also have a melt index in the range of 0.001–0.6 g/10 min, preferably 0.005–0.1 g/10 min (measured at 190° C. under a load of 2160 g).

The high-density polyethylene for layer (a) may be incorporated with other resins in an amount not harmful to the effect of the present invention. Examples of such resins include polyolefin resin (other than polyethylene), polystyrene, polyamide resin, saturated polyester resin (such as polyethylene terephthalate), polycarbonate resin, polyvinyl chloride resin, and polyvinylidene chloride resin.

Scraps resulting from molding or recovered from consumers may be recycled. Recycling of such scraps is desirable for environmental protection and cost reduction. Scraps may be used alone or in combination with virgin high-density polyethylene to form the layer (a). Alternatively, it is possible to form the layer (a) from the blend of virgin high-density polyethylene and recycled scraps.

Recovered scraps are usually composed of high-density polyethylene (as a major component), EVOH resin, and adhesive resin. They may be incorporated with a compatibilizer and stabilizer so as to improve the moldability. Examples of the compatibilizer and stabilizer include ethylene-acrylate ester-maleic anhydride terpolymer, modified polyolefin having at least one functional group selected from boronic acid group, borinic acid group, and boron-containing group convertible into boronic acid group or borinic acid group in the presence of water, metal salt of higher fatty acid, and hydrotalcite.

The fuel tank of the present invention is formed by laminating the high-density polyethylene layers (a) on both sides of the EVOH layer (c), with the adhesive resin layer (b) placed between them. The resulting fuel tank has outstanding gasoline barrier properties and impact resistance. According to the preferred embodiment of the present invention, the high-density polyethylene layers (a) should be the innermost layer and the outermost layer; however, they may be covered with a layer of any other resin so long as the object of the present invention is not hindered. The total thickness of the inner and outer high-density polyethylene layers (a) should be in the range of 300–10000 μm, preferably 500–8000 μm, and most desirably 1000–6000 μm.

The adhesive resin used for the intermediate layer (b) is not specifically restricted. It may be selected from modified polyolefin resin, polyurethane resin, and one-pack or two-pack polyester resin. The first one (especially carboxylic acid-modified polyolefin resin) is desirable from the standpoint of adhesion to EVOH and high-density polyethylene and moldability. It may be obtained by copolymerization or grafting of olefin polymer with an unsaturated carboxylic acid or anhydride thereof (such as maleic anhydride). In this case, the olefin polymer should preferably be polyethylene from the standpoint of adhesion with high-density polyethylene and compatibility with recycled scraps. Examples of such carboxylic acid-modified polyethylene include those which are obtained by modification with a carboxylic acid of polyethylene {such as low-density polyethylene (LDPE), linear low-density polyethylene (LLDPE), super low-density polyethylene (SLDPE)}, ethylene-vinyl acetate copolymer, or ethylene-methyl or ethyl (meth)acrylate copolymer.

The adhesive resin layer (b) interposed between the high-density polyethylene layer (a) and the EVOH layer (c) contributes to good interlayer bonding for the fuel tank having good gasoline barrier properties and impact resistance. The total thickness of the adhesive resin layers (b) should be in the range of 5–1000 μm, preferably 10–500 μm, and most preferably 20–300 μm. The adhesive resin layer would be poor in adhesion properties if it is excessively thin. It would cause cost increase if it is excessively thick.

The multi-layer construction for the high-density polyethylene layers (a), intermediate adhesive layers (b), and core EVOH layer (c) may be represented as follows. In the case where the layers of recycled resin are included, they are indicated by "r".

5 layers:
  (inside) a/b/c/b/a (outside), a/b/c/b/r, r/b/c/b/a
6 layers:
  a/b/c/b/r/a, a/r/b/c/b/a, r/a/b/c/b/a, a/r/b/c/b/r,
  r/a/b/c/b/r, a/b/c/b/a/r, r/b/c/b/r/a, r/b/c/b/a/r
7 layers:
  a/r/b/c/b/r/a, a/r/b/c/b/a/r, r/a/b/c/b/a/r,
  r/a/b/c/b/r/a, a/r/b/c/b/r/a, r/a/b/c/b/a/r The above-listed layer construction is not limitative. Of these examples, a/b/c/b/a and a/b/c/b/r/a are desirable.

The total thickness of the fuel tank should be in the range of 310–10000 μm, preferably 500–8500 μm, and most desirably 1000–7000 μm. (Incidentally, the thickness is an average value measured at the bulge of the fuel tank.) An excessively large thickness leads to a heavy fuel tank which is unfavorable for gas mileage and production cost. An excessively small thickness leads to a weak fuel tank due to low stiffness. An adequate thickness should be selected according to the capacity and intended use of the fuel tank.

The multi-layered fuel tank of the present invention may be produced in any manner which is not specifically restricted. Typical molding methods include extrusion molding, blow molding, and injection molding, which are commonly used in the field of polyolefins. Of these molding methods, coextrusion molding and coinjection molding are desirable, particularly coextrusion blow molding is desirable.

The fuel tank of the present invention may be mounted on automobiles, motor cycles, vessels, aircraft, electric generators, and other industrial and agricultural machines. It may also be used as a portable container or storage container.

The fuel tank may be used for gasoline and oxygen-containing gasoline (produced by blending gasoline with methanol and/or MTBE). It may also be used for other fuels such as heavy oil, gas oil, and kerosene. It will produce its desired effect when it is used for oxygen-containing gasoline.

Each layer may be incorporated with additives such as antioxidant, plasticizer, heat stabilizer, UV light absorber, antistatic agent, slip agent, colorant, and filler. Their respective examples are given below.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, and 4,4'-thiobis-(6-t-butyiphenol). UV light absorber: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, and 2-hydroxy-4-ethoxybenzophenone.

Plasticizer: dimethyl phthalate, diethyl phthalate, dioctyl phthalate, wax, liquid paraffin, and phosphate ester.

Antistatic agent: pentaerythritol monostearate, sorbitan monopalmitate, sulfated polyolefins, polyethylene wax, and carbowax.

Slip agent: ethylene bis-stearamide and butyl stearate.

Colorant: carbon black, phthalocyanine, quinacridone, indoline, azo dyes, and red oxide.

Filler: glass fiber, asbestos, wollastonite, calcium silicate, talc, and montmorillonite.

For prevention of gel formation, the EVOH may be incorporated with any one or more of hydrotalcite compounds, hindered phenol- or hindered amine-heat stabilizers, and metal salt of higher fatty acid (such as calcium stearate and magnesium stearate) in an amount of 0.01–1 wt %.

EXAMPLES

The invention will be described in more detail with reference to the following examples and comparative examples, which are not intended to limit the scope of the invention.

Example 1

A 500-ml container of five-layered construction was prepared by coextrusion blow molding from high-density polyethylene (HDPE) for the inner and outer layers, adhesive resin (AD) for the intermediate layers, and EVOH for the core layer. The arrangement and thicknesses of the layers are shown below.

inner HDPE/AD/EVOH/AD/outer HDPE

435/50/75/50/1890 μm

HDPE: "HZ8200B" from Mitsui Petrochemical Industries, Ltd.

MI=0.01 g/10 min (at 190° C. and 2160 g load)
density=0.96 g/cm$^3$

EVOH: ethylene content=32 mol %
saponification degree=99.6%
MI=3.0 g/10 min (at 190° C. and 2160 g load)

AD: maleic anhydride modified polyethylene, "Admer GT4" from Mitsui Petrochemical Industries, Ltd.
MI=0.2 g/10 min (at 190° C. and 2160 g load)

This container was filled with 300 ml of model gasoline composed of toluene (42.5 wt %), isooctane (42.5 wt %), and methanol (15 wt %). With the mouth tightly stoppered, the container was allowed to stand at 20° C. and 65% RH. The weight loss measured after 4 days was 0.33 g (an average of 6 samples).

The container was filled with water and the filled container was dropped on the concrete floor to test its impact resistance. The mean failure height for 50% of the samples to break was 7.5 m. The mean failure height was calculated according to Section 8 of JIS K7211 (a result of 30 samples).

Examples 2 to 15 and Comparative Examples 1 to 12

The same procedure as in Example 1 was repeated except that the layer arrangement and layer thickness were changed as shown in Table 1. The results of the tests for barrier properties and impact resistance are also shown in Table 1.

Example 16 and Comparative Example 13

The containers prepared in Example 1 and Comparative Example 4 were tested for barrier properties in the same manner as in Example 1, except that the model gasoline was replaced by the one composed of toluene (50 wt %) and isooctane (50 wt %), without methanol. The weight loss was 0.02 g and 0.03 g, respectively.

Examples 17 to 20

The same procedure as in Example 1 was repeated except that the EVOH was replaced by the one with a different ethylene content. The results are shown in Table 2.

Example 21

The same procedure as in Example 1 was repeated except that the EVOH was replaced by the one modified with 0.01 mol % of trimethoxyvinylsilane. (ethylene content=47 mol %, degree of hydrolysis=96.0 mol %, MI=5.0 g/10 min at 190° C. under a load of 2160 g). The weight loss was 0.73 g and the mean failure height was 7.7 m.

Comparative Example 14

The same procedure as in Example 1 was repeated except that the EVOH was replaced by a resin blend (in pellet form) composed of 10 wt % of EVOH and 90 wt % of linear low-density polyethylene (LLDPE), both specified below.

EVOH: ethylene content=32 mol %
degree of hydrolysis=99.6 mol %
MI=3.0 g/10 min at 190° C. and 2160 g load LLDPE "Ultzex 2022L" (from Mitsui Petrochemical Industries, Ltd.)
MI=2.1 g/10 min at 210° C. and 2160 g load The weight loss was 2.93 g and the mean failure height was 8.1 m.

Comparative Example 15

The same procedure as in Example 1 was repeated except that the EVOH was replaced by a resin blend (in pellet form) composed of 80 wt % of EVOH and 20 wt % of nylon-6 (PA-6), both specified below.

EVOH: ethylene content=32 mol %
degree of hydrolysis=99.6 mol %
MI=3.0 g/10 min at 190° C. and 2160 g load Nylon-6: "Ube Nylon 1022B" from Ube Industries, Ltd.
MI=7.2 g/10 min at 230° C. and 2160 g load The weight loss was 1.04 g and the mean failure height was 7.9 m.

Comparative Example 16

The same procedure as in Example 1 was repeated except that the HDPE was replaced by a linear low-density polyethylene (LLDPE) specified below.

LLDPE: "Ultzex 2022L" (from Mitsui Petrochemical Industries, Ltd.)
MI=2.1 g/10 min at 210° C. and 2160 g load density= 0.920 g/cm$^3$ The weight loss was 1.26 g and the mean failure height was 7.5 m. The resulting sample was so poor in stiffness that it was easily deformed under load.

Example 22

The same procedure as in Example 1 was repeated except that the adhesive resin was replaced by "Bondyne TX 830" (from Atchem Co., Ltd.) which is a terpolymer composed of ethylene (60 wt %), acrylate ester (36 wt %), and maleic anhydride (4 wt %), having a melt index of 4.0 g/10 min (at 190° C. under a load of 2160 g). The weight loss was 0.38 g and the mean failure height was 7.3 m.

Example 23

The same procedure as in Example 1 was repeated except that the adhesive resin was replaced by "EV270" (from Mitsui DuPont Polychemical Co., Ltd.) which is an ethylene-vinyl acetate copolymer, having a melt index of 4.0 g/10 min (at 190° C. under a load of 2160 g). The weight loss was 0.37 g and the mean failure height was 6.2 m.

Example 24

The same procedure as in Example 1 was repeated except that the HDPE for the inner layer was replaced by a recycled resin obtained by crashing and subsequent pelleting from the multi-layered container prepared in Example 1. The weight loss was 0.31 g and the mean failure height was 6.9 m.

Example 25

The same procedure as in Example 1 was repeated except that the outer HDPE layer was formed in double layers. The outermost layer was formed from the same HDPE as used in Example 1. The adjacent layer was formed from a recycled resin obtained by crashing and subsequent pelleting from the multi-layered container prepared in Example 1. The ratio of the thickness of the outermost layer to the thickness of the adjacent layer was 3:1. The weight loss was 0.32 g and the mean failure height was 6.5 m.

TABLE 1

| Example No | Layer construction (a)/(b)/(c)/(d)/(e) (μm) | Thickness ratio (A/B) | Thickness ratio (I/O) | Weight loss (g) | Mean failure height (m) |
|---|---|---|---|---|---|
| Example 1 | 435/50/75/50/1890 | 0.03 | 20/80 | 0.33 | 7.6 |
| Comparative Example 1 | 2500/0/0/0/0 | 0 | — | 3.13 | 8.6 |
| Example 2 | 449/50/5/50/1946 | 0.002 | 20/80 | 2.24 | 7.9 |
| Example 3 | 448/50/13/50/1940 | 0.005 | 20/80 | 1.66 | 7.8 |
| Example 4 | 445/50/25/50/1930 | 0.01 | 20/80 | 0.92 | 7.3 |
| Comparative Example 2 | 1188/50/25/50/1188 | 0.01 | 50/50 | 1.87 | 6.1 |
| Comparative Example 3 | 0/0/75/50/2375 | 0.03 | 0/100 | 0.24 | 5.3 |
| Example 5 | 23/50/75/50/2302 | 0.03 | 3/97 | 0.25 | 5.8 |
| Example 6 | 47/50/75/50/2278 | 0.03 | 4/96 | 0.26 | 5.9 |
| Example 7 | 71/50/75/50/2254 | 0.03 | 5/95 | 0.28 | 6.2 |
| Example 8 | 193/50/75/50/2133 | 0.03 | 10/90 | 0.29 | 6.7 |
| Example 9 | 678/50/75/50/1648 | 0.03 | 30/70 | 0.39 | 6.6 |
| Example 10 | 969/50/75/50/1357 | 0.03 | 42/58 | 0.47 | 6.1 |
| Comparative Example 4 | 1163/50/75/50/1163 | 0.03 | 50/50 | 0.49 | 5.7 |
| Comparative Example 5 | 2375/50/75/0/0 | 0.03 | 100/0 | 1.06 | 4.7 |
| Comparative Example 6 | 485/0/75/0/1940 | 0.03 | 20/80 | 0.87 | 3.6 |
| Example 11 | 425/50/125/50/1850 | 0.05 | 20/80 | 0.11 | 6.8 |
| Example 12 | 971/50/125/50/1304 | 0.05 | 43/57 | 0.15 | 5.5 |
| Comparative Example 7 | 0/0/250/50/2200 | 0.10 | 0/100 | 0.03 | 4.1 |
| Example 13 | 400/50/250/50/1750 | 0.10 | 20/80 | 0.04 | 6.2 |
| Comparative Example 8 | 1300/50/250/50/850 | 0.10 | 60/40 | 0.06 | 4.1 |
| Comparative Example 9 | 1930/50/250/50/220 | 0.10 | 88/12 | 0.12 | 3.9 |
| Comparative Example 10 | 2200/50/250/0/0 | 0.10 | 100/0 | 0.22 | 3.8 |
| Example 14 | 720/50/300/50/1380 | 0.12 | 35/65 | 0.04 | 4.6 |
| Comparative Example 11 | 1050/50/300/50/1050 | 0.12 | 50/50 | 0.06 | 4.2 |
| Example 15 | 350/50/500/50/1550 | 0.20 | 20/80 | 0.05 | 5.7 |
| Comparative Example 12 | 950/50/500/50/950 | 0.20 | 50/50 | 0.08 | 3.6 |

TABLE 2

| Example No. | Ethylene content | Weight loss | Mean failure height |
|---|---|---|---|
| Example 17 | 27 mol % | 0.29 g | 7.2 m |
| Example 18 | 38 mol % | 0.48 g | 7.6 m |
| Example 19 | 44 mol % | 0.62 g | 7.6 m |
| Example 20 | 51 mol % | 0.98 g | 7.8 m |

What is claimed is:

1. A fuel tank of multi-layer construction for containing gasoline containing oxygen-containing compounds, which comprises:

(a) inner and outer layers of high-density polyethylene,
   (b) intermediate layers of adhesive resin, and
   (c) a core layer of ethylene-vinylene alcohol copolymer,
       wherein a ratio (I/O) is less than about 40/60,
       wherein I is the total thickness of the layers positioned inside the layer (c), and O is the total thickness of the layers positioned outside the layer (c),
       wherein the layer (c) has a thickness which satisfies the formula:

$$0.005 \leq A/B \leq 0.13$$

wherein A is the thickness of the layer (c), and B is the thickness of all of the layers.

2. The fuel tank of claim 1, wherein the ratio (I/O) is less than 35/65.

3. The fuel tank of claim 2, wherein the ratio (I/O) is about 30/70.

4. The fuel tank of claim 3, wherein the ratio (I/O) is about 20/80.

5. The fuel tank of claim 1, wherein the ratio A/B is less than 0.10.

6. The fuel tank of claim 1, wherein the ethylene/vinyl alcohol copolymer, comprises ethylene units in an amount of about 20 to 60 mol %.

7. The fuel tank of claim 1, wherein the thickness of the tank is in the range of about 310–10,000 μm.

8. The fuel tank of claim 1, wherein the ethylene-vinyl alcohol copolymer of core layer (c) has a melt index (MI) in a range of 0.1 to 50 g/10 min at 190° C. under a load of 2160 g.

9. The fuel tank of claim 1, wherein the ethylene-vinyl alcohol copolymer of core layer (c) has a melt index (MI) in a range of 0.5 to 20 g/min at 190° C. under a load of 2160 g.

10. The fuel tank of claim 1, wherein the high-density polyethylene has a density of greater than 0.93 g/cm$^3$.

11. The fuel tank of claim 10, wherein the high-density polyethylene has a density of greater than 0.94 g/cm$^3$.

12. The fuel tank of claim 1, wherein the total thickness of the high-density polyethylene layers (a) is in the range of about 300–10,000 μm.

13. The fuel tank of claim 12, wherein the total thickness of the high-density polyethylene layers (a) is in the range of about 500–8,000 μm.

14. The fuel tank of claim 13, wherein the total thickness of the high-density polyethylene layers (a) is in the range of about 1,000–6,000 μm.

15. The fuel tank of claim 1, wherein the total thickness of the adhesive resin layers (b) is in the range of about 5–1,000 μm.

16. The fuel tank of claim 15, wherein the total thickness of the adhesive resin layers (b) is in the range of about 10–500 μm.

17. The fuel tank of claim 16, wherein the total thickness of the adhesive resin layers (b) is in the range of about 20–300 μm.

18. The fuel tank of claim 1, wherein the ethylene-vinyl alcohol copolymer of core layers (c) contains an effective amount of one or more of hydrotalcite compounds, hindered phenol- or hindered-amine heat stabilizers or metal salts of higher fatty acids, to prevent gel formation.

* * * * *